US012805973B2

(12) United States Patent
Yang et al.

(10) Patent No.: US 12,805,973 B2
(45) **Date of Patent: *Nov. 24, 2026**

(54) DENTAL HANDPIECE

(71) Applicant: Beyes Dental Canada Inc., Morrisburg (CA)

(72) Inventors: Hua Yang, Morrisburg (CA); Min Li, Guangzhou (CN); Changming Chen, Guangzhou (CN)

(73) Assignee: BEYES DENTAL CANADA INC., Morrisburg (CA)

( * ) Notice: Subject to any disclaimer, the term of this patent is extended or adjusted under 35 U.S.C. 154(b) by 28 days.

This patent is subject to a terminal disclaimer.

(21) Appl. No.: 18/946,818

(22) Filed: Nov. 13, 2024

(65) Prior Publication Data

US 2025/0064552 A1 Feb. 27, 2025

Related U.S. Application Data

(63) Continuation of application No. 17/394,441, filed on Aug. 5, 2021, now Pat. No. 12,161,516.

(30) Foreign Application Priority Data

Aug. 7, 2020 (CN) ........................ 202010791147.2

(51) Int. Cl.
*A61C 1/05* (2006.01)

(52) U.S. Cl.
CPC .............. *A61C 1/057* (2013.01); *A61C 1/052* (2013.01)

(58) Field of Classification Search
CPC ........... A61C 1/05; A61C 1/052; A61C 1/057; A61C 17/005
See application file for complete search history.

(56) References Cited

U.S. PATENT DOCUMENTS 7,329,123 B2 * 2/2008 Tanaka .................. A61C 1/057 433/132
8,092,217 B2 1/2012 Zhang
10,064,698 B2 9/2018 Zhang
2013/0266430 A1 10/2013 Hasegawa

FOREIGN PATENT DOCUMENTS

CN 102805665 A 12/2012
CN 105380718 A 3/2016
CN 205234664 U 5/2016
CN 207084861 U 3/2018
CN 208864515 U 5/2019

(Continued)

*Primary Examiner* — Edward Moran

(57) ABSTRACT

A dental handpiece includes a barrel, an air turbine, a central shaft, a bearing and a seal. The barrel includes an axial open end. The air turbine is rotatably provided in the barrel. The central shaft is secured to the air turbine to rotate with the air turbine. The bearing is mounted in the barrel and supports the central shaft for rotation. The seal is trumpet-shaped and arranged between the open end of the barrel and the bearing. The seal includes a sealing portion sleeved over an outer cylindrical surface of the central shaft. The sealing portion is deformable to separate from the outer cylindrical surface of the central shaft or closely contact the outer cylindrical surface of the central shaft depending on a pressure difference between interior and exterior of the barrel.

13 Claims, 3 Drawing Sheets

(56) References Cited

FOREIGN PATENT DOCUMENTS

| | | | |
|---|---|---|---|
| CN | 213249859 | U | 5/2021 |
| EP | 2226032 | A1 | 9/2010 |
| EP | 2578179 | A1 | 4/2013 |
| JP | 2001204740 | A | 7/2001 |
| WO | 2018189229 | A1 | 10/2018 |

* cited by examiner

DENTAL HANDPIECE

CROSS-REFERENCE TO RELATED APPLICATIONS

The present disclosure is a continuation of U.S. patent application Ser. No. 17/394,441, filed on Aug. 5, 2021, which claims the priority of China Patent Application No. 202010791147.2, filed on Aug. 7, 2020, the entire contents of which are incorporated herein by reference.

FIELD

The present invention relates to the technical field of medical devices, in particular to a dental handpiece.

BACKGROUND

A dental turbine handpiece includes a barrel with an air turbine received therein. The air burbine is blown by compressed air to rotate within the barrel and generate power. The air turbine is attached around a central shaft, and a dental tool, such as a bur, is mounted at one end of the central shaft that extends out of the barrel. The rotating air turbine drives rotation of the central shaft, which in turn drives the bur to rotate. For the dental turbine handpieces currently available on the market, during operation, their central shafts are driven by the air turbines to rotate at a speed up to 300,000 to 400,000 RPM.

However, during treating patients, doctors often need to stop the turbine handpiece to replace the bur or observe patient's oral condition. After shutdown, the central shaft and the air turbine will keep rotating for 4-5 seconds due to inertia, which causes a negative pressure to be generated inside the air cylinder of the turbine handpiece, such that blood, water, and various sundries produced by grinding of teeth are sucked back into the barrel. On one hand, the sucked sundries may enter into a bearing of the handpiece, which may seriously affect safety and service life of the bearing; on the other hand, the blood and water may enter into the cylinder and cause pollution, which may result in cross-infection among patients even if disinfection is subsequently performed.

SUMMARY

In view of the above, a dental handpiece that can effectively prevent suck-back after shutdown is provided.

In one aspect, a dental handpiece includes a barrel comprising an axial open end; an air turbine rotatably provided in the barral; a central shaft secured to the air turbine to rotate with the air turbine; a bearing mounted in the barrel and supporting the central shaft for rotation, and a seal being trumpet-shaped and arranged between the open end of the barrel and the bearing, the seal comprising a sealing portion sleeved over an outer cylindrical surface of the central shaft, the sealing portion being deformable to separate from the outer cylindrical surface of the central shaft or closely contact the outer cylindrical surface of the central shaft depending on a pressure difference between interior and exterior of the barrel.

In one embodiment, the seal is an elastic component with a Shore A hardness of 50-70 degrees.

In one embodiment, an inner diameter of the sealing portion in a natural state is smaller than a diameter of the central shaft, and the sealing portion is in close contact with the outer cylindrical surface of the central shaft when the dental handpiece is shutdown.

In one embodiment, the sealing portion is a curved structure arched toward the outer cylindrical surface of the central shaft, which corresponds to an arc surface radius of 1-3 mm.

In one embodiment, a radially inner surface of the sealing portion is a cylindrical surface that is in close contact with the outer cylindrical surface of the central shaft when the dental handpiece is shutdown.

In one embodiment, the seal further comprises an annular mounting portion surrounding the sealing portion, the sealing portion extending from an inner edge of the mounting portion radially inward and axially toward the open end of the barrel, the mounting portion having a greater thickness along an axial direction of the barrel than the sealing portion.

In one embodiment, along the axial direction of the barrel, the mounting portion has a thickness of 0.4-1.0 mm while the sealing portion has a thickness of 0.1-0.3 mm.

In one embodiment, the barrel is provided with a bearing seat therein, the bearing seat is formed therein with a bearing hole in which the bearing is mounted, and the mounting portion is arranged between the bearing and the bearing seat and is flattened by the bearing and the bearing seat.

In another aspect, a dental handpiece includes a barrel defining an accommodating cavity therein and comprising an axial open end in communication with the accommodating cavity; an air turbine rotatably arranged in the accommodating cavity of the barral; a central shaft secured to the air turbine to rotate with the air turbine; a bearing mounted in the barrel adjacent the axial open end of the barrel and supporting the central shaft for rotation, and a seal being trumpet-shaped and comprising a sealing portion sleeved over an outer cylindrical surface of the central shaft and a mounting portion surrounding the sealing portion, the mounting portion being arranged and flattened between the open end of the barrel and the bearing.

In one embodiment, a bearing seat is provided in the barrel, the bearing seat is formed with a bearing hole and an annular groove at an axial end of the bearing seat facing the air turbine, the bearing is disposed in the bearing hole, the mounting portion is received in the annular groove and sandwiched between the bearing and the bearing seat.

In one embodiment, a depth of the annular groove in an axial direction of the barrel is smaller than a thickness of the mounting portion in the natural state.

In one embodiment, the mounting portion has a circular or elliptical cross section, and the annular groove has a square or rectangular cross section.

In one embodiment, a flat gasket is provided between an axial end of the bearing and the bearing seat, and the mounting portion is sandwiched between the flat gasket and the bearing seat.

In one embodiment, the aforementioned bearing is a first bearing, the aforementioned bearing seating is a first bearing seat, the dental handpiece further comprises a second bearing and a second bearing seat, the first bearing and the second bearing are respectively arranged at opposite axial sides of the air turbine, the first bearing is disposed in the first bearing seat and close to the open end of the barrel while the second bearing is disposed in the second bearing seat and away from the open end of the barrel, and an elastic washer is provided between an axial end of the second bearing and the second bearing seat.

In one embodiment, the sealing portion is deformable to separate from the outer cylindrical surface of the central shaft or closely contact the outer cylindrical surface of the central shaft depending on a pressure difference between interior and exterior of the barrel.

In one embodiment, the seal is an elastic member with a Shore A hardness of 50-70 degrees.

In one embodiment, the sealing portion extends from an inner edge of the mounting portion radially inward and axially toward the open end of the barrel.

In one embodiment, a radially inner side surface of the sealing portion defines a through hole at a center of the sealing portion, the central shaft passes through the through hole, the radially inner side surface is a cylindrical surface, and the cylindrical surface is in close contact with the outer cylindrical surface of the central shaft when the dental handpiece is shutdown.

In one embodiment, the mounting portion having a greater thickness along an axial direction of the barrel than the sealing portion; wherein, along the axial direction of the barrel, the mounting portion has a thickness of 0.4-1.0 mm while the sealing portion has a thickness of 0.1-0.3 mm.

In one embodiment, the dental handpiece includes a handle connected to the barrel, a main air passage and an exhaust passage are formed in the handle corresponding to the air turbine, and both the main air passage and the exhaust passage are communicated with the accommodating cavity for inflow and outflow of compressed air, respectively.

In summary, the dental handpiece of the present application includes a seal that can expand outwardly or contract inwardly by corresponding deformation of the seal under the action of a pressure difference between interior and exterior of the barrel, such that during operation, the seal is separated from the central shaft to facilitate the rotation of the central shaft, and after shutdown, the seal and the central shaft closely contact each other to form a good braking and sealing effect, thereby preventing foreign matters from being sucked back into the barrel. This on one hand ensures the safety and service life of the bearing, and on the other hand avoids cross-infection among patients.

DESCRIPTION OF THE EMBODIMENTS

In order to facilitate the understanding of the present invention, the present invention will be described more fully below with reference to the relevant drawings. The accompanying drawings exemplarily show one or more embodiments of the present invention so as to make the understanding of the technical solutions disclosed in the present invention more accurate and thorough. However, it should be understood that the present invention can be implemented in many different forms and is not limited to the embodiments described below.

Figure 1:
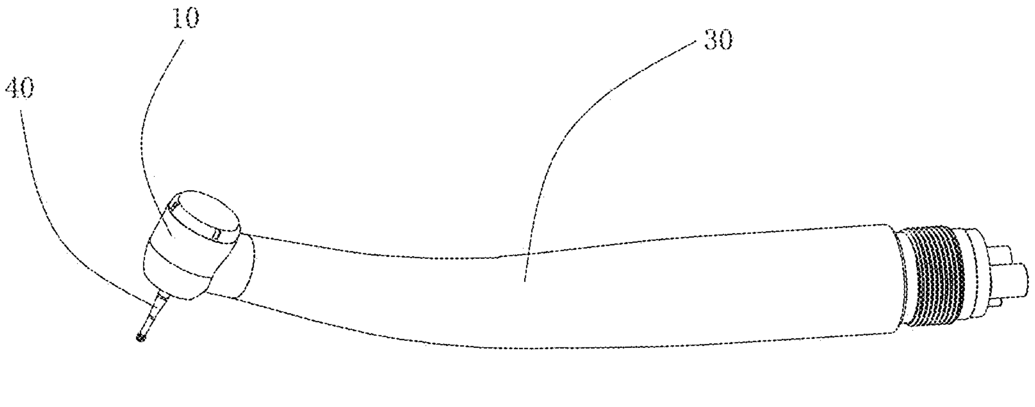
FIG. 1 illustrates a dental handpiece according to one embodiment of the present invention.
Figure 2:
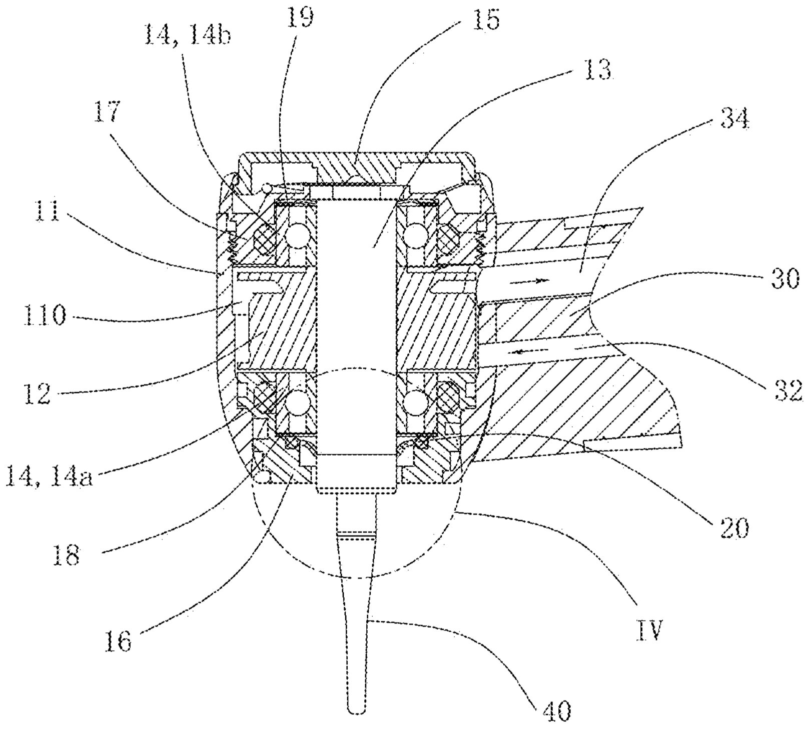
FIG. 2 is a cross-sectional view of the dental handpiece shown in FIG. 1.

As shown in FIGS. 1-2, a dental handpiece according to an embodiment of the present invention includes a head 10 and a handle 30 connected to the head 10. The handle 30 is convenient for users, such as a dentist, to hold. The head 10 includes a barrel 11 to which the handle 30 is connected, an air turbine 12 rotatably provided in the barrel 11, a central shaft 13 secured to the air turbine 12, a bearing 14 supporting the central shaft 13 for rotation, and a seal 20.

The barrel 11 generally has a hollow cylindrical structure, and is formed with an accommodating cavity 110 therein for installing the air turbine 12. Opposite axial ends (i.e. front and rear ends) of the barrel 11 are formed with openings respectively, and a rear cover 15 is provided at a rear end of the barrel 11. The central shaft 13 is fixedly inserted through a center of the air turbine 12, and its front and rear ends each extend out of the air turbine 12. The rear end of the central shaft 13 is rotatably supported at the center of the rear cover 15, and the front end thereof extends out of the barrel 11 through the opening located at the front end of the barrel 11. A medical tool such as a bur 40 is connected to the front end of the central shaft 13. Corresponding to the air turbine 12, a main air passage 32 and an exhaust passage 34 are formed in the handle 30, and both the main air passage 32 and the exhaust passage 34 are communicated with the accommodating cavity 110 for inflow and outflow of compressed air, respectively.

When the dental handpiece operates, the compressed air is delivered into the accommodating cavity 110 through the main air passage 32 to drive the air turbine 12 to rotate at a high speed, thereby driving the central shaft 13 to rotate, which in turn drives the medical tool, such as the bur 40, to grind teeth. Usually, during operation, the central shaft 13 may rotate at a speed up to 300,000 to 400,000 RPM. The compressed air flows along wall surfaces of the accommodating cavity 110 to drive the air turbine 12 to rotate, and finally flows out of the accommodating cavity 110 through the exhaust passage 34. In order to ensure effectiveness of torque transmission between the air turbine 12 and the central shaft 13, a circumferentially limiting arrangement may be formed between the air turbine 12 and the central shaft 13 by means of keying, snapping, etc., such that the air turbine 12 and the central shaft 13 can rotate synchronously under the driving of the compressed air.

Two bearings 14 are provided, which are referred to as a first bearing **14*a* and a second bearing 14*b* hereinafter for ease of description. The first bearing 14*a* and the second bearing 14*b* are respectively sleeved over the front end and rear end of the central shaft 13, and are respectively located on the front and rear sides of the air turbine 12 in the axial direction, to ensure balance and stability of the rotation of the air turbine 12 and the central shaft 13, thereby reducing the generation of noise. In this embodiment, both the first and second bearings 14*a*, 14*b* are ball bearings, which form rolling friction during the rotation of the central shaft 13, thereby effectively reducing wear. It should be understood that the first and second bearings 14*a*, 14*b* may also be sliding bearings, ceramic bearings, etc.; in addition, the first and second bearings 14*a*, 14*b*** may also be different types of bearings, which are not limited to the specific embodiments described herein.

The first bearing **14*a* is assembled into the barrel 11 via a first bearing seat 16, and the second bearing 14*b* is assembled into the barrel 11 via a second bearing seat 17. In this embodiment, an outer edge of a front end of the first bearing seat 16 and an inner edge of the front end of the barrel 11 form matching steps, which axially abut against each other to form a limiting arrangement; an outer wall surface of the second bearing seat 17 and an inner wall surface of the rear end of the barrel 11 form matching threads, which are screwed and fixed to each other; the rear cover 15 is hooked and connected to an end of the second bearing seat 17. It should be understood that the first bearing seat 16 and/or the second bearing seat 17 may be integrally formed in the barrel 11, or the second bearing seat 17 and the rear cover 15** may be a unitary structure.

A first bearing hole is formed at a center of a side of the first bearing seat 16 facing the air turbine 12 for assembling the first bearing 14*a*. Preferably, a flat gasket 18 is provided between the first bearing seat 16 and a front axial end of the first bearing 14*a*. A seal 20 is sleeved over the central shaft 13 and located on the front side of the first bearing 14*a*, particularly, in this embodiment, sandwiched between the flat gasket 18 and the first bearing seat 16, for providing scaling between the first bearing 14*a* and the front end of the barrel 11 during the shutdown of the dental handpiece. It should be understood that the flat gasket 18 provided between the first bearing seat 16 and the first bearing 14*a* may be omitted, and then the seal 20 is sandwiched between the first bearing 14*a* and the first bearing seat 16.

A second bearing hole is formed at a center of the second bearing seat 17 for assembling the second bearing 14*b*. An elastic member 19, such as an elastic washer, is provided between the second bearing seat 17 and a rear axial end of the second bearing 14*b*. In assembly, the first bearing seat 16, the seal 20, the flat gasket 18, the first bearing 14*a*, the central shaft 13 and the air turbine 12 are sequentially assembled into the barrel 11; the elastic member 19 and the second bearing 14*b* are assembled into the second bearing seat 17, and then the second bearing seat 17 is screwed to the barrel 11. During the process of screwing, inner rings of the first bearing 14*a* and second bearing 14*b* clamp the air turbine 12, the elastic member 19 is compressed and deformed to generate a forward pre-tightening force, which acts on the seal 20 via the second bearing 14*b*, the air turbine 12, the first bearing 14*a* and the flat gasket, such that the seal 20 is clamped and flattened.

Figure 3:
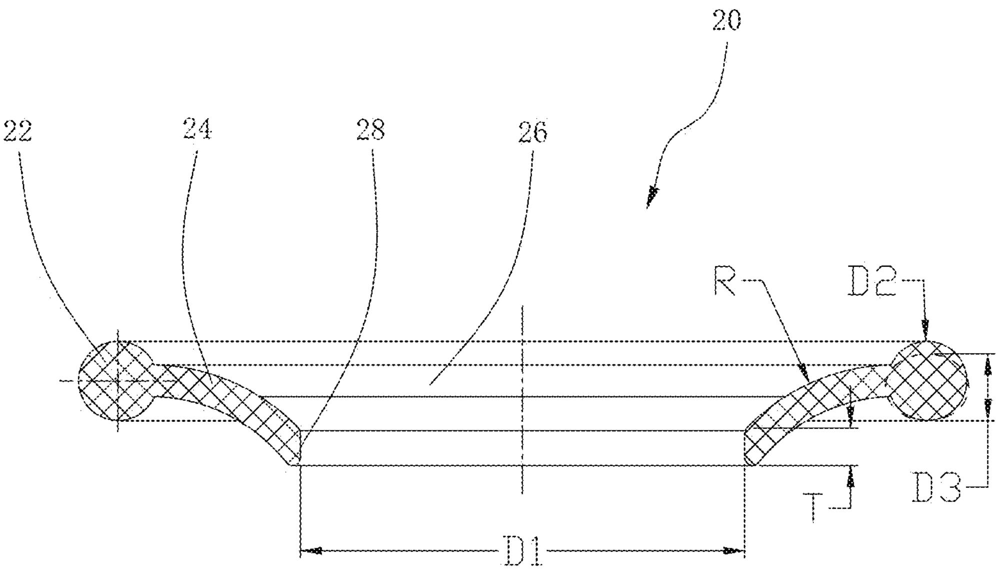
FIG. 3 is a cross-sectional view of a seal of the dental handpiece shown in FIG. 2.

Also referring to FIG. 3, the seal 20 is made of fluorine rubber, hydrogenated nitrile rubber or other materials, and preferably has a Shore A hardness of 50-70 degrees, which may provide advantages of oil resistance, abrasion resistance and high temperature resistance, and also can be fabricated directly by injection-molding and thus have low production cost. For example, the seal 20 has a Shore A hardness of 60 degrees. The seal 20 generally has a ring shape, and includes a mounting portion 22 located on an outer edge thereof, and a sealing portion 24 located inside the mounting portion 22. A radially inner side surface of the sealing portion 24 defines a through hole 26 at a center of the sealing portion 24, for the central shaft 13 to pass therethrough. The radially inner side surface serves as a working surface 28, and is in close contact with the outer cylindrical surface of the central shaft 13 when the dental handpiece is shutdown. Preferably, the through hole 26 is a cylindrical hole, and the working surface 28 is a cylindrical surface. The working surface 28 has a diameter D1 of preferably 2.8-3.0 mm, which is slightly smaller than the diameter of the central shaft 13.

Figure 4:
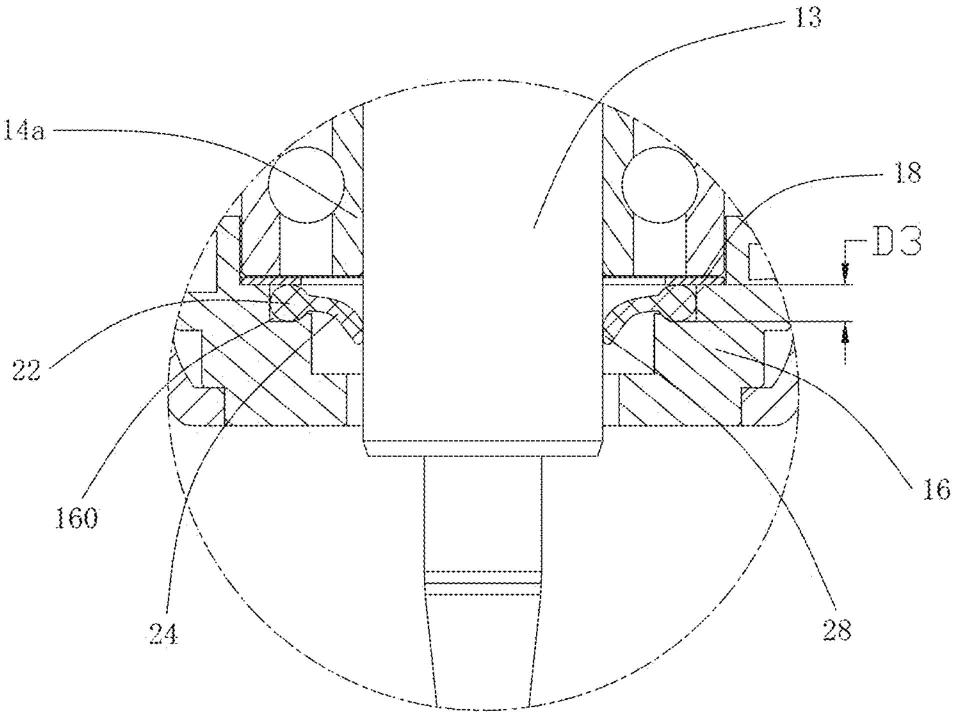
FIG. 4 is an enlarged view of an encircled portion IV of FIG. 2.

The mounting portion 22 may be generally annular with a circular or elliptical cross section, and resembles an O-ring. In this embodiment, the cross section of the mounting portion 22 is circular in a natural state, and the circular cross section has a diameter D2 of 0.4-1.0 mm, that is, a thickness of the mounting portion 22 in the axial direction of the barrel 11/central shaft 13 is 0.4-1.0 mm. Preferably, an annular groove 160 is formed in the first bearing seat 16 at a side of the first bearing seat 16 facing the air turbine 12, for receiving and positioning the mounting portion 22 of the seal 20. As shown in FIG. 4, the annular groove 160 has a square or rectangular cross section, which is different from the cross section of the mounting portion 22 and can provide a space for the deformation of the mounting portion 22. An axial depth of the annular groove 160 is smaller than the thickness D2 of the mounting portion 22 in the natural state. In an assembled state, the mounting portion 22 is sandwiched between the flat gasket 18 and the first bearing seat 16 and is flattened, such that the mounting portion 22 has a roughly elliptical cross section, as shown in dashed lines in FIG. 3. After being flattened, the mounting portion 22 has a thickness D3 equivalent to the axial depth of the annular groove 160, and thus has a difference of 0.05-0.1 mm from its original thickness D2.

The sealing portion 24 is generally trumpet-shaped, and extends radially inward from the inner edge of the mounting portion 22 and axially toward the front end of the barrel 11. The sealing portion 24 is tapered from back to front in the axial direction of the seal 20. Preferably, the thickness of the sealing portion 24 in the axial direction of the barrel 11 is smaller than the diameter of the mounting portion 22, so that the sealing portion 24 may have better clastic deformation ability while the mounting portion 22 may be fixed better. Preferably, the thickness T of the sealing portion 24 in the axial direction of the barrel 11/the central shaft 13 is 0.1-0.3 mm. In this embodiment, the sealing portion 24 is a curved structure arched toward the central shaft 13, which corresponds to an arc surface radius R of 1-3 mm.

As shown in FIG. 4, when the dental handpiece of the present invention does not operate, the working surface 28 of the sealing portion 24 closely contacts the outer cylindrical surface of the central shaft 13. Since the diameter of the working surface 28 is slightly smaller than that of the central shaft 13, the seal 20 may generate clastic deformation when the seal 20 and the central shaft 13 are assembled. In the assembled state, the working surface 28 of the seal 20 closely contacts the outer cylindrical surface of the central shaft 13. The close contact between the working surface 28 and the outer cylindrical surface of the central shaft 13 form a seamless connection therebetween, which isolates the components inside the barrel 11, especially the first bearing 14*a* and the second bearing 14*b*, from the outside, and ensures cleanness of the components inside the barrel 11. It should be noted that the outer cylindrical surface of the central shaft 13 mentioned in the present application refers to an outer circumferential wall surface of the central shaft 13, which is different from an axial end surface or an chamfered surface of the central shaft 13, and generally has a cylindrical shape. However, it is not excluded that the outer circumferential wall surface of the central shaft 13 may be formed with any small notch and other structure, that is, the outer cylindrical surface of the central shaft 13 mentioned in the present invention is not limited to a complete cylindrical surface.

Figure 5:
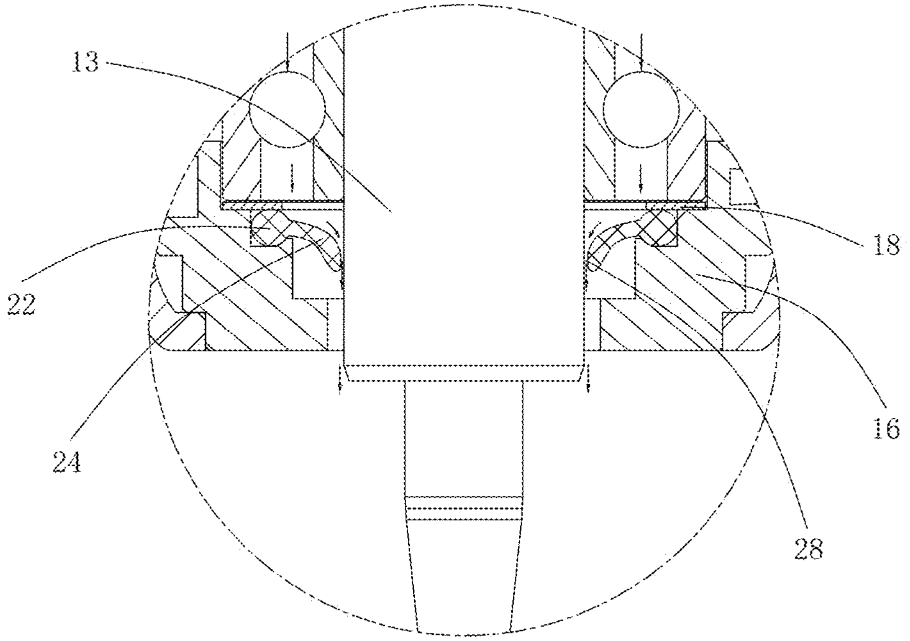
FIG. 5 illustrates an operation state of the dental handpiece.

As shown in FIG. 5, when the dental handpiece of the present invention operates, compressed air is introduced into the barrel 11 to drive the air turbine 12 and the central shaft 13 to rotate, and a small amount of the compressed air flows through a gap of the first bearing 14*a* to the seal 20, since the pressure of the compressed air is far more than the pressure of the external environment, the compressed air exerts an outward force on the sealing portion 24, which causes the sealing portion 24 to deform and expand outwards, and forms a gap between the working surface 28 of the sealing portion 24 and the outer cylindrical surface of the central shaft 13, so that the rotation of the central shaft 13 is not restricted by the seal 20, which effectively reduces friction and ensures the high-speed rotation of the central shaft 13. During operation of the dental handpiece, due to the pressure difference between the inside and outside of the barrel 11, external blood, impurities, etc. cannot enter the barrel 11 through the gap between the seal 20 and the central shaft 13.

Figure 6:
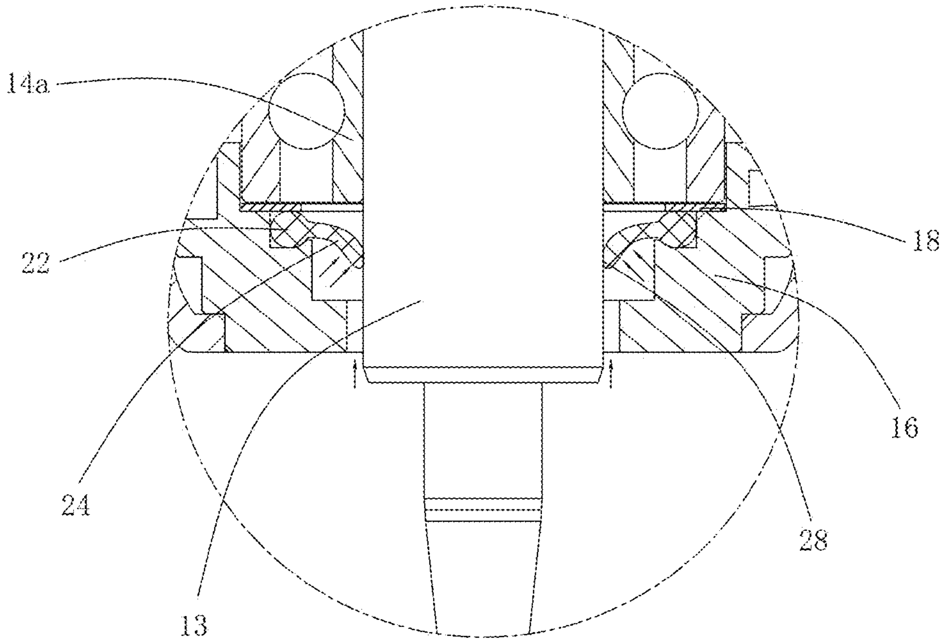
FIG. 6 illustrates a shutdown state of the dental handpiece.

As shown in FIG. 6, when the dental handpiece of the present invention is shutdown during use, the central shaft 13 and the air turbine 12 will continue rotating due to inertia. During shutdown, firstly, because no compressed air is delivered to the accommodating cavity 110 any more, the air pressure in the barrel 11 drops rapidly, and the sealing portion 24 recovers from the deformation and tightly wraps around the central shaft 13; after that, due to the continuing rotation of central shaft 13 and the air turbine 12, air is discharged out of the barrel 11, and thus a negative pressure is formed in the barrel 11 and the external ambient air exerts an inward force on the sealing portion 24, so that the sealing portion 24 deforms and contracts inward, and further tightly wrap around the central shaft 13 and, as a result, a sufficiently strong force is formed between the working surface 28 and the outer cylindrical surface of the central shaft 13. On one hand, the central shaft 13 is braked so as to quickly stop rotating. For example, it has been tested for the dental handpiece of the present invention that the shaft 13 can stop rotating within 2 seconds after shutdown. On the other hand, a sufficiently strong force is provided to prevent foreign matters, including blood, impurities, debris, etc., from entering the barrel 11, that is, to avoid the damage to the internal components, particularly the bearings **14*a* and 14*b***, and also avoid cross-infection among patients.

In summary, the present invention provides a seal 20 which may correspondingly deform, i.e., expand outwards or contracts inward, under the action of the internal and external pressure difference, so that during operation, the seal 20 separates from the central shaft 13 to facilitate the rotation of the central shaft 13, and during shutdown, the seal 20 tightly wraps around the central shaft 13 to form a good braking and sealing effect so as to prevent foreign matters from entering the barrel 11. In order to provide a good deformation effect, the sealing portion 24 of the seal 20 is less in thickness relative to the mounting portion 22 thereof, so that the relatively thicker mounting portion 22 has a sufficient thickness to allow for deformation under pressure during assembly, thereby providing a good seal at the mounting position of the seal 20 and further enhancing overall sealing effect. In addition, the sealing portion 24 is a curved structure arched toward the central shaft 13, and once deformed under a force, the curved structure has a deformation direction consistent with a bending direction of the inner edge of the sealing portion 24, so that the deformation is easier and the effect is better.

Those described above are merely preferred embodiments of the present invention and should not be used to limit the present invention. Any modifications, equivalent substitutions and improvements made without departing from the spirit and principle of the present invention should be integrated to fall within the scope of the present invention.

The invention claimed is:

1. A dental handpiece comprising:

a barrel defining an accommodating cavity therein;

an air turbine rotatably arranged in the accommodating cavity of the barrel;

a central shaft secured to the air turbine to rotate with the air turbine;

a bearing mounted in the accommodating cavity of the barrel and supporting the central shaft for rotation;

a seal comprising a sealing portion sleeved over an outer cylindrical surface of the central shaft and a mounting portion surrounding the sealing portion, the sealing portion being deformable to separate from the outer cylindrical surface of the central shaft or closely contact the outer cylindrical surface of the central shaft depending on a pressure difference between interior and exterior of the barrel; and a bearing seat provided in the barrel, the bearing seat being formed with a bearing hole and an annular groove at an axial end of the bearing seat facing the air turbine, the bearing disposed in the bearing hole, the mounting portion received in the annular groove and sandwiched between the bearing and the bearing seat, a bottom of the bearing hole being recessed axially to form the annular groove, a depth of the annular groove in an axial direction of the barrel being smaller than a thickness of the mounting portion when the mounting portion is in a natural state where the mounting portion is not compressed by the bearing, a diameter of the annular groove being smaller than a diameter of the bearing hole such that a step is formed between the annular groove and the bottom of the bearing hole, the bearing resisting against the step;

wherein a flat member is provided at an axial end of the bearing facing the bearing seat, and the mounting portion is compressed by the flat member against the bearing seat.

2. The dental handpiece of claim 1, wherein the flat member is a flat gasket.

3. A dental handpiece comprising:

a barrel defining an accommodating cavity therein and comprising an axial open end in communication with the accommodating cavity;

an air turbine rotatably arranged in the accommodating cavity of the barrel;

a central shaft secured to the air turbine to rotate with the air turbine;

a first bearing mounted in the barrel adjacent the axial open end of the barrel and supporting the central shaft for rotation;

a first bearing seat provided in the barrel to position the first bearing in the barrel, the first bearing seat being formed with an annular groove at an axial end of the first bearing seat facing the air turbine, a fixed axial distance being defined between an axial end of the first bearing facing the first bearing seat and a bottom of the annular groove when the first bearing is positioned in the barrel;

a seal comprising a sealing portion sleeved over an outer cylindrical surface of the central shaft and a mounting portion surrounding the sealing portion, the sealing portion being deformable to separate from the outer cylindrical surface of the central shaft or closely contact the outer cylindrical surface of the central shaft depending on a pressure difference between interior and exterior of the barrel, the mounting portion being received in the annular groove of the first bearing seat and compressed between the first bearing and the first bearing seat, a thickness of the mounting portion in an axial direction of the barrel being reduced to be equal to the axial distance when the mounting portion is compressed between the first bearing and the first bearing seat;

a second bearing and a second bearing seat, the first bearing and the second bearing being respectively arranged at opposite axial sides of the air turbine, the first bearing being close to the open end of the barrel while the second bearing being disposed away from the open end of the barrel, an elastic member provided to generate a forward pre-tightening force, which acts on the mounting portion of the seal via the second bearing, the air turbine, and the first bearing, such that the mounting portion of the seal is compressed; and wherein a flat member is provided at the axial end of the first bearing facing the first bearing seat, and the mounting portion is compressed by the flat member against the first bearing seat.

4. The dental handpiece of claim 3, wherein the flat member is a flat gasket.

5. The dental handpiece according to claim 3, wherein the seal is trumpet-shaped, and the sealing portion extends from an inner edge of the mounting portion radially inward and axially toward the open end of the barrel.

6. The dental handpiece according to claim 5, wherein a radially inner side surface of the sealing portion defines a through hole at a center of the sealing portion, the central shaft passes through the through hole, the radially inner side surface is a cylindrical surface, and the cylindrical surface is in close contact with the outer cylindrical surface of the central shaft when the dental handpiece is shutdown.

7. The dental handpiece according to claim 3, wherein, along the axial direction of the barrel, the mounting portion has a thickness of 0.4-1.0 mm while the sealing portion has a thickness of 0.1-0.3 mm.

8. A dental handpiece comprising:

a barrel defining an accommodating cavity therein;

an air turbine rotatably arranged in the accommodating cavity of the barrel;

a central shaft secured to the air turbine to rotate with the air turbine;

a bearing mounted in the accommodating cavity of the barrel and supporting the central shaft for rotation;

a bearing seat provided in the barrel and resisting against the bearing in an axial direction of the barrel, the bearing seat being formed with an annular groove at an axial end of the bearing seat facing the air turbine, an axial end of the bearing facing the bearing seat being spaced by a fixed axial distance from a bottom of the annular groove when the bearing seat resists against the bearing; and a seal comprising a sealing portion surrounding an outer cylindrical surface of the central shaft and a mounting portion surrounding the sealing portion, the sealing portion being deformable to separate from the outer cylindrical surface of the central shaft or closely contact the outer cylindrical surface of the central shaft depending on a pressure difference between interior and exterior of the barrel, the mounting portion received in the annular groove and compressed between the bearing and the bearing seat, and the mounting portion when compressed between the bearing and the bearing seat having a thickness in the axial direction equal to the axial distance;

wherein a flat member is provided at the axial end of the bearing facing the bearing seat, and the mounting portion is compressed by the flat member against the bearing seat.

9. The dental handpiece of claim 8, wherein the flat member is a flat gasket.

10. The dental handpiece of claim 8, wherein the aforementioned bearing is a first bearing, the aforementioned bearing seat is a first bearing seat, the dental handpiece further comprises a second bearing and a second bearing seat, the first bearing and the second bearing are respectively arranged at opposite axial sides of the air turbine, the first bearing is rested on the first bearing seat and close to an axial front end of the barrel while the second bearing is rested on the second bearing seat and close to an axial rear end of the barrel, and an elastic member is provided at the axial rear end of the barrel, wherein inner rings of the first bearing and second bearing clamp the air turbine, and the elastic member is compressed and deformed to generate a forward pre-tightening force, which acts on the mounting portion of the seal via the second bearing, the air turbine, and the first bearing, such that the mounting portion of the seal is compressed.

11. The dental handpiece of claim 8, wherein the seal is trumpet-shaped, and the sealing portion extends from an inner edge of the mounting portion radially inward and axially toward the open end of the barrel.

12. The dental handpiece of claim 11, wherein a radially inner side surface of the sealing portion defines a through hole at a center of the sealing portion, the central shaft passes through the through hole, the radially inner side surface is a cylindrical surface, and the cylindrical surface is in close contact with the outer cylindrical surface of the central shaft when the dental handpiece is shutdown.

13. The dental handpiece of claim 8, wherein, along the axial direction of the barrel, the mounting portion has a thickness of 0.4-1.0 mm while the sealing portion has a thickness of 0.1-0.3 mm.

* * * * *